A. RIPPIEN.
Apple-Paring Machine.
No. 169,040. Patented Oct. 19, 1875.
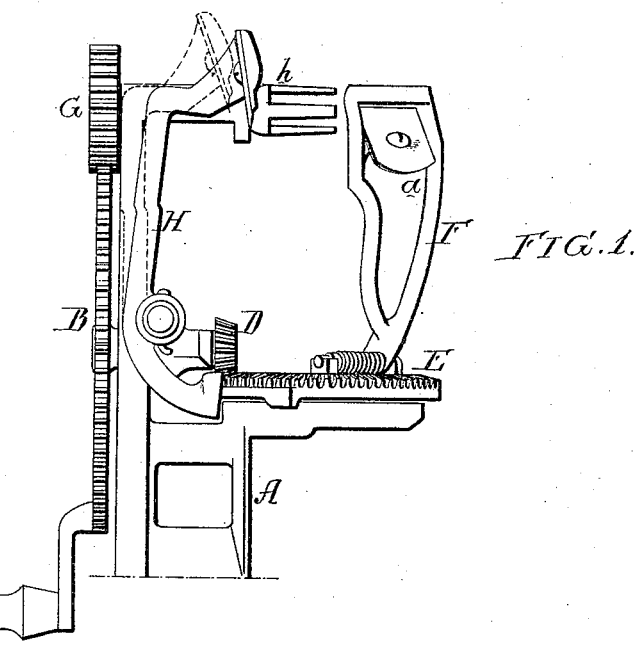
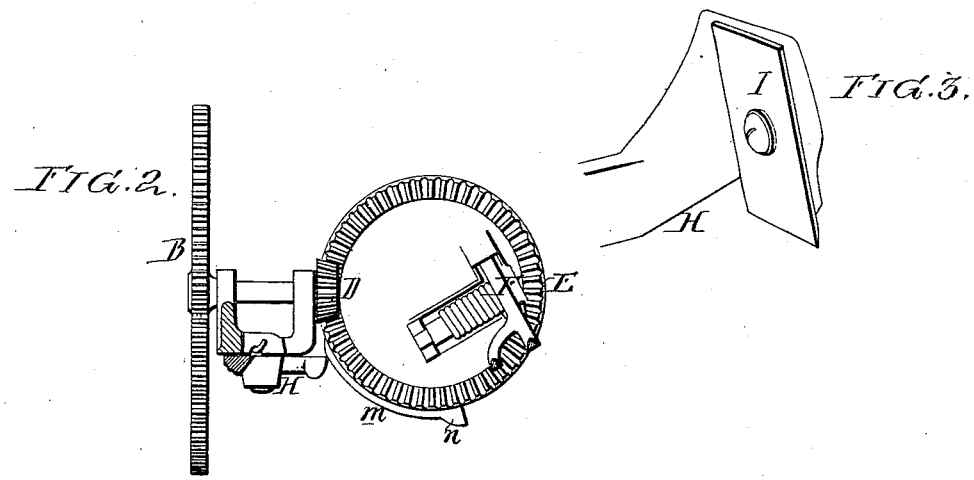
Witnesses, Hubert Howson
Thomas McIlvain
Adolph Rippien
by his Attorneys,
Howson and Son

UNITED STATES PATENT OFFICE.

ADOLPH RIPPIEN, OF READING, PA., ASSIGNOR TO WILLIAM HARBSTER, MATHAN HARBSTER, AND WILLIAM M. GRISCOM, OF SAME PLACE.

IMPROVEMENT IN APPLE-PARING MACHINES.

Specification forming part of Letters Patent No. 169,040, dated October 19, 1875; application filed May 31, 1875.

*To all whom it may concern:*

Be it known that I, ADOLPH RIPPIEN, of Reading, Pennsylvania, have invented certain Improvements in Apple-Paring Machines, of which the following is a specification:

The object of my invention is to so combine a supplementary knife with the knocking-off lever of an apple-paring machine that the portion of skin which remains on the fruit after being subjected to the ordinary machine shall be peeled off.

This object I attain in the manner which I will now proceed to describe, reference being had to the accompanying drawing, in which—

Figure 1 is a side view of sufficient of an apple-paring machine to illustrate my invention; Fig. 2, a plan view of the device shown in Fig. 1; and, Fig. 3, a detached view of the supplementary knife, drawn to an enlarged scale.

A represents a portion of the frame of an apple-paring machine; B, the driving-wheel, on the shaft of which is a bevel-pinion, D, gearing into the usual bevel-wheel E, the latter carrying the spring-arm F, which is furnished with the ordinary paring-blade a. The driving-wheel B gears into a pinion, G, on a spindle armed with the usual prongs h, to which the apple to be pared is attached.

The above described parts are similar to, and perform the same duties as, those of ordinary paring-machines.

H is a spring-lever, which performs the usual duty of forcing the pared apple from the prongs h, and to the upper end of this lever I attach a blade, I, as shown in the enlarged view, Fig. 3, the lower short arm of this lever being acted on by a rib, m, on the edge of the wheel E, in the manner which I will now proceed to explain. As long as the rib is free from contact with the arm of the knocking-off lever the blade I will occupy the position shown by dotted lines in Fig. 1, but as soon as the rib comes in contact with the lever, the latter will be moved to the position shown by plain lines in Fig. 1, and the supplementary paring-blade will be in the proper position for removing that portion of the skin of the apple which in ordinary machines escapes the action of the main paring-blade. Owing to the concentricity of the rib m with the wheel E the supplementary blade I remains stationary in the position shown in Fig. 1 long enough to remove every particle of this portion of the skin, after which a projection, n, in which the said rib terminates, comes in contact with the short arm of the knocking-off lever H, and the long arm consequently pushes the pared apple from the prongs h.

I desire it to be understood that I do not claim, broadly, the use of a supplementary knife for removing the skin from the base of the apple, as one mode of effecting this removal is shown in the case of W. M. Griscom filed June 16, 1875; but

I claim as my invention—

1. The combination, in an apple-paring machine, of a supplementary blade, I, with the knocking-off lever, substantially as and for the purpose herein set forth.

2. The combination of the knocking-off lever of an apple-paring machine and its supplementary knife, the rib m, and projection n on the wheel F.

In testimony whereof I have signed my name to this specification in the presence of two subscribing witnesses.

ADOLPH RIPPIEN.

Witnesses:
PETER R. SCHLEGEL,
J. WARREN TRYON.